United States Patent [19]

Matsumoto

[11] Patent Number: 4,828,078
[45] Date of Patent: May 9, 1989

[54] AUTOMATIC GAP-ADJUSTING BRAKE

[75] Inventor: Eiji Matsumoto, Kitakyushu, Japan

[73] Assignee: Murakami Seiki Mfg. Co. Ltd., Fukuoka, Japan

[21] Appl. No.: 209,469

[22] PCT Filed: Oct. 23, 1987

[86] PCT No.: PCT/JP87/00813
§ 371 Date: Jun. 21, 1988
§ 102(e) Date: Jun. 21, 1988

[87] PCT Pub. No.: WO88/03615
PCT Pub. Date: May 19, 1988

[30] Foreign Application Priority Data

Nov. 6, 1986 [JP] Japan ................................ 61-265116

[51] Int. Cl.$^4$ ............................................ F16D 65/52
[52] U.S. Cl. ............................ 188/196 BA; 188/71.8;
188/73.45; 188/79.51; 188/161; 188/171;
188/72.1

[58] Field of Search ............... 188/196, 79.51–79.56,
188/71.8, 71.9, 72.1, 73.45, 71.1, 156–165, 72.3,
73.44, 73.43, 171, 173; 192/111 A

[56] References Cited

U.S. PATENT DOCUMENTS

| | | | |
|---|---|---|---|
| 3,908,802 | 9/1975 | Shimodaira et al. | 188/196 BA X |
| 3,917,035 | 11/1975 | Grewette et al. | 188/196 BA X |
| 4,071,121 | 1/1978 | Daniel | 188/171 X |
| 4,102,444 | 7/1978 | Palme | 188/72.1 |
| 4,142,610 | 3/1979 | Alexander et al. | 188/196 BA X |
| 4,156,478 | 5/1979 | Kroeger | 188/171 |
| 4,181,201 | 1/1980 | McCarthy | 188/171 |
| 4,226,307 | 10/1980 | Dorot | 188/71.8 X |
| 4,228,874 | 10/1980 | Brinkmann et al. | 188/72.1 |
| 4,718,523 | 1/1988 | Rudolf et al. | 188/72.1 X |

Primary Examiner—Douglas C. Butler
Attorney, Agent, or Firm—Jordan and Hamburg

[57] ABSTRACT

This invention is a device for automatically adjusting the gap between a brake lining and a brake disk or drum. The gap can therefore be within the specified range for optimum braking performance, even when the brake linings become worn through extensive use.

1 Claim, 5 Drawing Sheets

AUTOMATIC GAP-ADJUSTING BRAKE

TECHNICAL FIELD

The present invention relates to a disk or drum brake wherein the gap between the disk or drum and the brake lining, that is, the electromagnet stroke, can be adjusted automatically to within the rated value.

BACKGROUND ART

The electromagnet stroke in a disk brake generally is small, in the order of 0.7 to 1.0 mm. Therefore, when the brake lining or the like wears, increasing the electromagnet stroke, shocks and vibration will increase during braking, in addition to which unless adjustment is carried out the electromagnetic induction may become inoperative and slipping arise between the disk and the lining, causing the lining to wear rapidly and generating heat in the disk, which can result in a major accident.

Devices have been proposed, e. g., by Japanese Patent Publication No. 59(1984)-16130, for automatically correcting for an increase in the gap between the disk and the brake lining so that the gap is always maintained within the specified range. This type of device comprises a lever that is used to magnify the small movement of the armature of the electromagnet that operates the brake lining to thereby move, by one tooth at a time, a ratchet wheel that is integral with an adjusting screw for adjusting the brake lining gap.

Because a conventional device of this type employs a system of magnifying the amount of wear by means of a lever, it is necessary to use many pins and lever holes. Therefore, wear produced in the pins and lever holes gives rise to accumulated error, as a result of which a long working life with high reliability cannot hope to be achieved.

From a consideration of the aforementioned problems, an objective of the present invention is to achieve a long working life with high reliability.

DISCLOSURE OF INVENTION

In order to achieve this objective, the automatic gap-adjusting brake according to the present invention comprises, in a brake device which applies braking force by clamping a rotating member such as a brake disc or brake drum between a primary and a secondary brake lining, the provision of a means comprising one end of a detector rod affixed to the electromagnet armature which drives the primary brake lining of the said brake device, a detection member having a stepped portion on its side surface affixed to the other end of the detector rod, a lever which is rotatably attached to a fixing base to which the said secondary brake lining is affixed, a detection piece having a stepped portion which engages with the stepped portion on the said detection member is affixed to the end of the said lever, a switch which detects the movement of the said lever when the stepped portion of the said detection member is engaged with the stepped portion of the said detection piece when the electromagnet stroke increases owing to wear of the brake lining or the like, whereby the operation of the said switch causes the stroke of said secondary brake lining to approach the specified stroke on the primary brake lining side.

In accordance with this invention, when the brake lining wears and the armature electromagnet stroke increases, and the stepped portion of the detection member comes into engagement with the stepped portion of the detection piece, the end of the lever turns to describe a stroke that is the same as the depth of the stepped portion. The movement of the lever at this point is made to operate a switch to move the ratchet by one tooth to adjust automatically the brake lining gap.

BEST MODE FOR CARRYING OUT THE INVENTION

Figure 1:
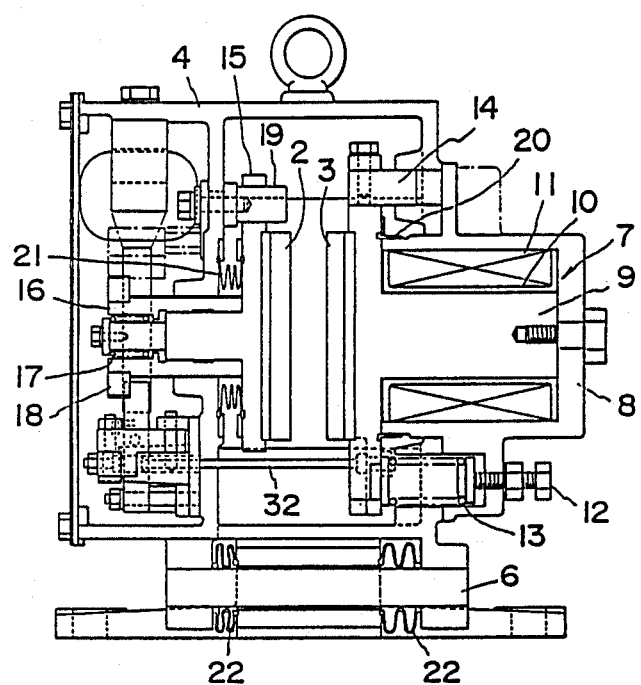
FIG. 1 is a front, sectional view of an embodiment of the present invention.

An embodiment of the present invention will now be described with reference to the accompanying drawings.

With reference to FIG. 1 to 4, braking is performed by the clamping motion of brake linings 2 and 3 on a disk 1. The clamping force is transmitted by a bridge 4 which is slidably attached to a fixing frame 5 by a pair of pins 6. The yoke 8 of an electromagnet 7 is affixed by means of an armature 9 and a slide metal-cum-bobbin 10 made of gun-metal. The numeral 11 denotes the coil of the electromagnet 7. Provided above and below the electromagnet 7 are spring-force adjusting screws 12 and torque springs 13. A pin 14 is provided to prevent the armature 9 from rotating when the brake is being operated. A pad holder 15 is attached to an adjusting screw 16 via spring 17. A ratchet wheel 18 is affixed to the adjusting screw 16 by a roll pin (not shown) so as to rotate integrally therewith. In the drawings, the numeral 19 denotes a torque pin and 20 to 22 denote dust bellows.

Figure 2:
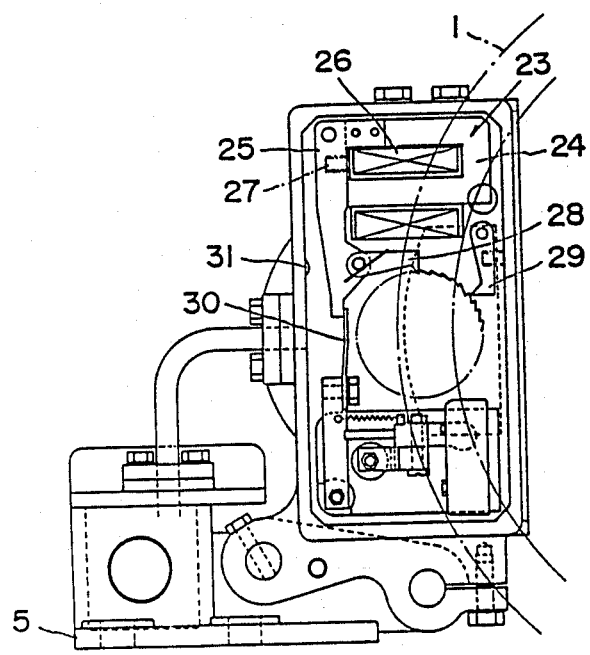
FIGS. 2 and 3 are left and right side views, respectively.
Figure 3:
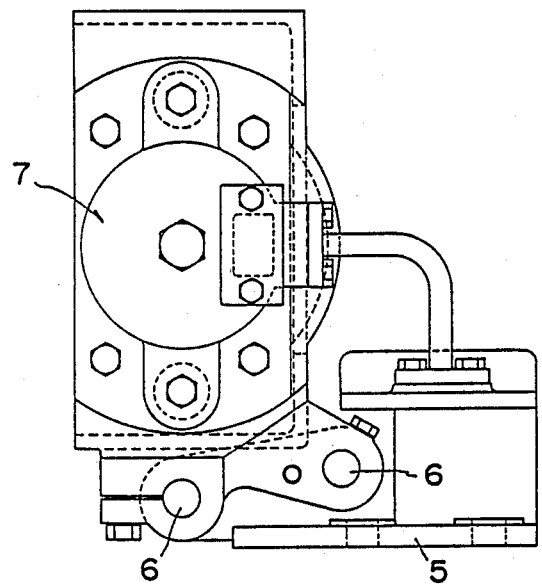
Figure 4:
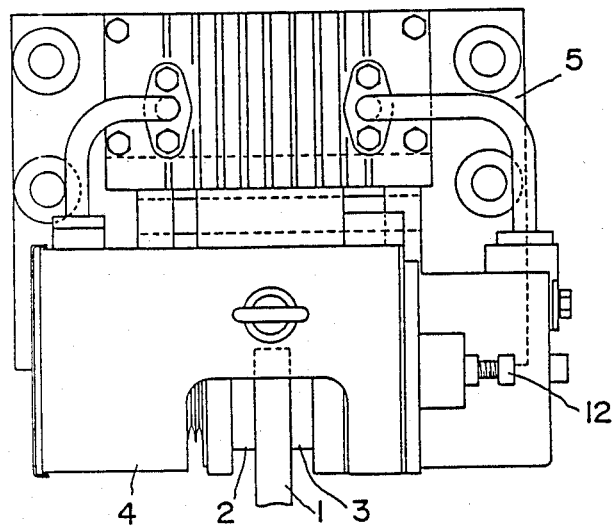
FIG. 4 is a plan view thereof.

In FIG. 2, 23 is an electromagnet for gap-adjustment, 24 is the yoke of the electromagnet 23, 25 is the armature, 26 is the electromagnet coil and 27 is the return spring, 28 is a ratchet, 29 is a ratchet which prevents the adjusting screw 16 from being rotated naturally clockwise by vibration or the like, 30 is a lever and 31 is a stop.

Figure 5:
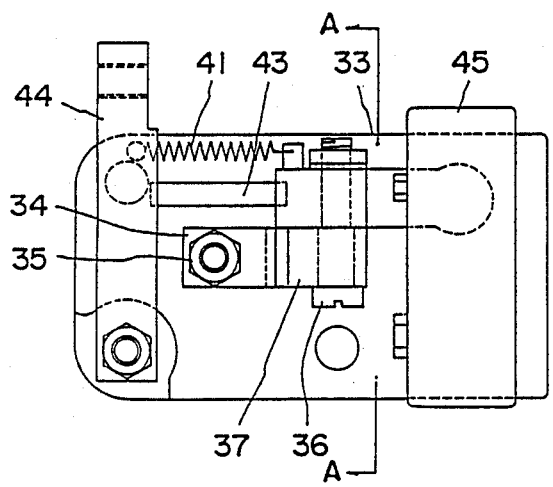
FIG. 5 is a front view of the gap detecting portion.
Figure 6:
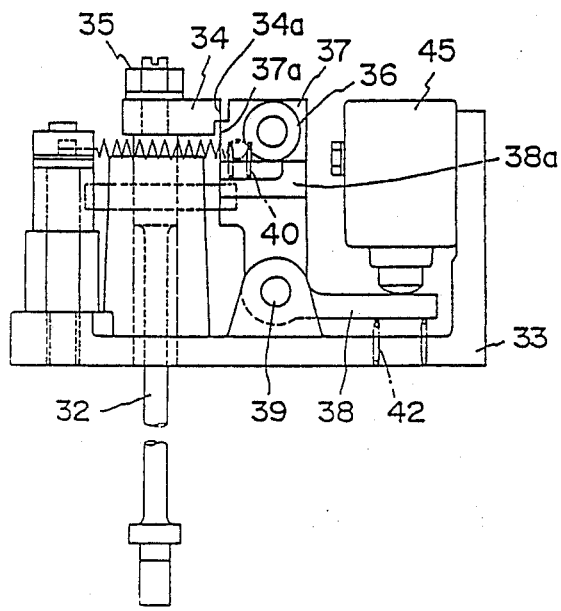
FIG. 6 is a plan view of the portion shown in FIG. 5.
Figure 7:
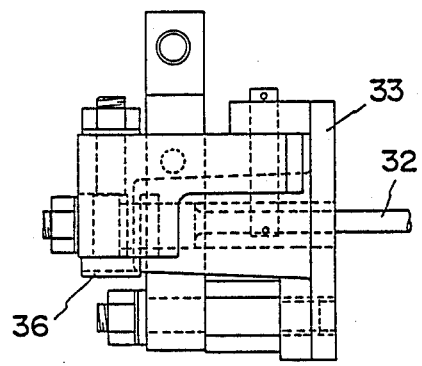
FIG. 7 is a side view through the line A—A of FIG. 5.
Figure 9:
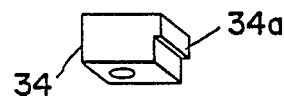
FIGS. 9(a), 9(b), 9(c) and 9(d) are perspective views of the various parts.
Figure 9:
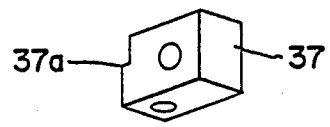
Figure 9:
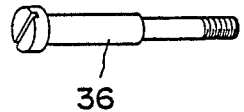
Figure 9:
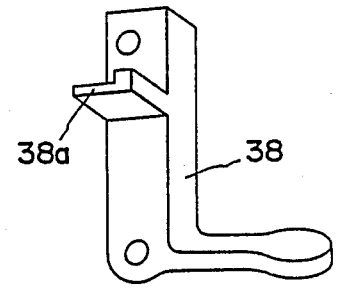

With reference now to FIGS. 5 to 7, one end of a detector rod 32 is guided into a fixing base 33 and the other end thereof is coupled to the armature 9. The detector rod 32 has been made slender and flexible so that any play that might arise in the armature 9 will not affect the guide portion of the fixing base 33. Affixed to the end of the detector rod 32 is a stroke detection member 34, and the detection gap is set by a nut 35. As shown in FIG. 6, a side portion of the stroke detection member 34 is provided with a stepped portion 34a (see FIG. 9a) which normally engages on a stepped portion 37a (FIG. 9c) formed on a detection piece 37 which is rotatably mounted on a pin 36 (FIG. 9b).

The pin 36 is affixed to one end of a lever 38 (FIG. 9d), and the lever 38 is rotatably attached to the fixing base 33 by a pin 39. Formed on the lever 38 is a stop 38a which stops the rotation of the detection piece 37 under the urging of a spring 40. A spring 41 maintains a rod 43 that links the lever 38 and the pin 36 so that there is no separation of the end of the rod 43. Numeral 42 denotes a spring that urges the lever 38 counterclockwise, and 44 is a lever. A microswitch 45 is attached to one end of the lever 38.

Figure 8:
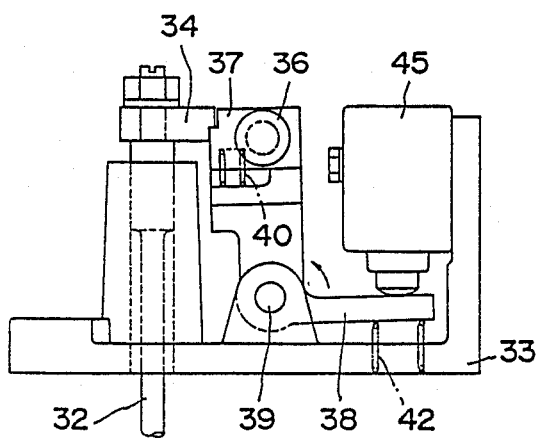
FIGS. 8a and 8b are plan views of the operating states.
Figure 8:
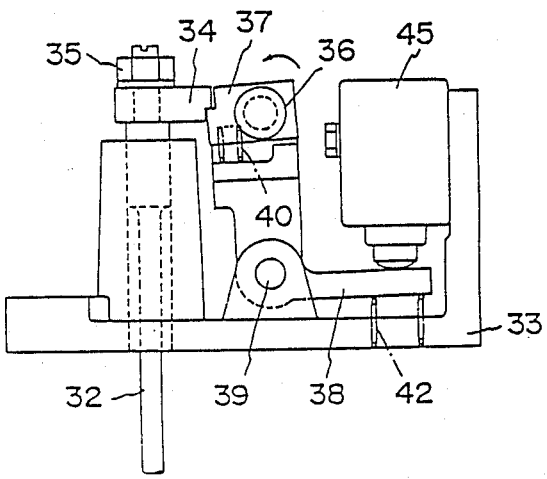
Figure 10:
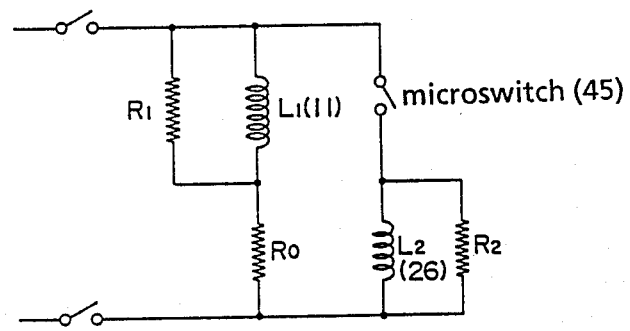
FIG. 10 is an electrical circuit diagram of the electromagnet coil and the microswitch.

When the lining becomes worn from many braking operations, the electromagnet stroke becomes enlarged and the stepped portion 34a of the stroke detection member 34 becomes disengaged from the stepped portion 37a of the detection piece 37, the detection piece 37 rotates couterclockwise, forming the state shown in FIG. 8a. The coil 11 of the electromagnet 7, the coil 26 of the electromagnet 23 and the microswitch 45 are connected as shown by the circuit diagram of FIG. 10. The microswitch 45 is normally in the break state, but in assuming the state of FIG. 8a the lever 38 presses the microswitch 45 into the make state. If at this point the electrical power source to release the brake is introduced into the circuit, a flow of current is set up in the braking electromagnet coil 11, attracting the armature 9. The detector rod 32, the movement of which is the same as that of the armature 9, is moved in the direction shown by the arrow in FIG. 8b, pivoting counterclockwise the detection piece 37 about pin 36. Next, although current is flowing in the coil 26 connected in series with the microswitch 45, while the force of the torque spring 13 is acting, because the frictional force of the adjusting screw 16 is greater, the ratchet wheel 18 cannot move. When the armature 9 is attracted and the action of the spring 13 force is stopped, the ratchet wheel 18 can be advanced by one tooth. A lever 44 (FIG. 5) held by the lever 30 is moved to the right by the pushing of the end of the armature 25 and the lever 38 is turned to the right by the rod 43 attached via the tension spring 41, putting the microswitch 45 into the break state and stopping the flow of current in the coil 26. The armature 25 is brought to rest on the right stop 31 by the return spring 27. The lever 38 is urged counterclockwise by the spring 42, but with the electromagnet 7 stroke returning to normal, the state becomes as shown in FIG. 6. Thus, if the electromagnet stroke becomes enlarged by worn linings resulting from repeated applications of the brake, the stroke can be adjusted to operate within the specified stroke range by repeating the aforementioned operations.

Although a disk brake was used as the example for the above explanation, the present invention is of course also applicable to drum brakes.

As described in the foregoing, in the present invention, a stroke detection member having a stepped portion is attached to the end of a stroke detection rod, the construction being such that the said detection member stepped portion is brought into contact with a stepped portion provided on a detection piece provided on the end of a lever. The stepped portions of the detection member and detection piece first come into mutual engagement when the gap caused by wear to the brake lining reaches a specified value. This causes the lever to turn and operate a switch, which enables the said gap to be adjusted. Thus, there are only two parts at the location of the wear, i. e., the detection member and the detection piece, the other parts only moving when the gap is being adjusted automatically. Wear and damage are therefore dramatically reduced and reliability improved. In addition, it enables manufacturing costs to be greatly reduced.

INDUSTRIAL APPLICABILITY

This invention can be employed for the brakes of the motors such as winding, traversing or traveling motor of crane, truck motor, roller conveyor motor, machine tool motor, process line driving motor, etc.

I claim:

1. An automatic gap-adjusting brake comprising, in a brake device which applies braking force by clamping a rotating member such as a brake disk or brake drum between a primary and a secondary brake lining, the provision of a means comprised of one end of a detector rod being affixed to an electromagnet armature which drives the primary brake lining of the said brake device, a detection member having a stepped portion on its side surface affixed to the other end of the detector rod, a lever which is rotatable attached to a fixing base to which the said secondary brake lining is affixed, a detection piece having a stepped portion which engages with the stepped portion on the said detection member affixed to the end of the said lever, a switch which detects the movement of the said lever when the stepped portion of the said detection member is engaged with the stepped portion of the said detection piece when the electromagnet stroke increases owing to wear of the brake lining or the like, whereby the operation of the said switch causes the stroke of said secondary brake lining to approach the specified stroke on the primary brake lining side.

* * * * *